US012577793B2

(12) United States Patent
Boucké

(10) Patent No.: US 12,577,793 B2
(45) Date of Patent: Mar. 17, 2026

(54) PANEL, IN PARTICULAR A FLOOR, CEILING, OR WALL PANEL; A COVERING CONSTRUCTED BY A MULTITUDE OF SUCH PANELS; AND A METHOD FOR THE RECYCLING OF SUCH A PANEL

(71) Applicant: I4F Licensing NV, Turnhout (BE)

(72) Inventor: Eddy Alberic Boucké, Turnhout (BE)

(73) Assignee: i4F Licensing NV, Turnhout (BE)

( * ) Notice: Subject to any disclaimer, the term of this patent is extended or adjusted under 35 U.S.C. 154(b) by 246 days.

(21) Appl. No.: 18/038,786

(22) PCT Filed: Nov. 25, 2021

(86) PCT No.: PCT/EP2021/083000

§ 371 (c)(1),
(2) Date: May 25, 2023

(87) PCT Pub. No.: WO2022/112417

PCT Pub. Date: Jun. 2, 2022

(65) Prior Publication Data

US 2024/0003142 A1 Jan. 4, 2024

(30) Foreign Application Priority Data

Nov. 26, 2020 (NL) ...................................... 2026988

(51) Int. Cl.
*E04F 15/00* (2006.01)
*B44C 5/04* (2006.01)
(Continued)

(52) U.S. Cl.
CPC .............. *E04F 15/107* (2013.01); *B44C 5/04* (2013.01); *E04B 9/045* (2013.01); *E04F 13/18* (2013.01); *E04F 15/105* (2013.01)

(58) Field of Classification Search
CPC .......... E04F 15/02033; E04F 15/02038; E04F 15/107; E04F 15/102; E04F 15/105;
(Continued)

(56) References Cited

U.S. PATENT DOCUMENTS

| | | | | |
|---|---|---|---|---|
| 8,495,848 | B2 * | 7/2013 | Pervan | E04F 15/02 52/592.1 |
| 8,728,603 | B2 * | 5/2014 | Windmoller | B32B 27/12 52/592.4 |

(Continued)

FOREIGN PATENT DOCUMENTS

| | | | |
|---|---|---|---|
| JP | 2000218724 | A | 8/2000 |
| JP | 200222194 | A | 1/2002 |

(Continued)

*Primary Examiner* — Chi Q Nguyen
(74) *Attorney, Agent, or Firm* — The Webb Law Firm

(57) ABSTRACT

A panel, in particular a floor, ceiling, or wall panel, of a planar design having a top side, a bottom side and multiple side edges, which panel has a laminated structure of layers that are adhered to each other. The layers extend parallel to the plane of the panel, and include a core layer having a lower side and an upper side, and a top layer which is provided on the upper side of the core layer either directly or indirectly. At least two layers of the panel, in particular the top layer and the core layer, are directly or indirectly adhered to each other by an intermediate adhesive layer. The intermediate adhesive layer is composed of adjacent intermediate zones which include non-adhesive intermediate zones and adhesive intermediate zones, which intermediate adhesive layer establishes an adhesive strength between the two layers, such that a durable adhesion between the two layers is obtained, and a clean delamination of the two layers is allowed for when the two layers are subjected to a sufficient delamination force.

20 Claims, 3 Drawing Sheets

(51) Int. Cl.

| | |
|---|---|
| ***E04B 9/04*** | (2006.01) |
| ***E04F 13/18*** | (2006.01) |
| ***E04F 15/10*** | (2006.01) |

(58) Field of Classification Search

CPC ................ E04F 13/18; E04F 2201/042; E04F 2201/0107; E04F 2201/03; E04F 2201/0552; E04F 2201/023; E04F 2201/0535; E04F 2201/0146; E04F 2201/043; E04F 2201/0547; E04F 2201/0153; E04F 2201/0138; B44C 5/04; E04B 9/045

See application file for complete search history.

(56) References Cited

U.S. PATENT DOCUMENTS

| | | | | |
|---|---|---|---|---|
| 10,190,323 | B2 * | 1/2019 | Meersseman | E04B 1/541 |
| 10,472,833 | B2 * | 11/2019 | Loncke | B32B 27/42 |
| 12,110,693 | B1 * | 10/2024 | Devos | E04F 15/02038 |
| 2007/0175156 | A1 * | 8/2007 | Pervan | E04F 15/02 52/582.1 |
| 2010/0281803 | A1 * | 11/2010 | Cappelle | E04F 15/02038 52/309.1 |
| 2011/0167744 | A1 * | 7/2011 | Whispell | E04F 15/02016 52/309.1 |
| 2011/0271632 | A1 * | 11/2011 | Cappelle | F16B 5/0056 52/582.2 |
| 2020/0123788 | A1 * | 4/2020 | Baert | B32B 13/12 |
| 2020/0131784 | A1 * | 4/2020 | Boucké | E04F 13/0894 |
| 2020/0308846 | A1 * | 10/2020 | Josefsson | E04F 13/076 |
| 2021/0363759 | A1 * | 11/2021 | Baert | E04F 13/0866 |

FOREIGN PATENT DOCUMENTS

| | | | |
|---|---|---|---|
| JP | 2019183565 | A | 10/2019 |
| KR | 1020140109459 | A | 9/2014 |
| WO | 2014181031 | A1 | 11/2014 |
| WO | 2019135141 | A1 | 7/2019 |
| WO | 2020114642 | A1 | 6/2020 |

* cited by examiner

PANEL, IN PARTICULAR A FLOOR, CEILING, OR WALL PANEL; A COVERING CONSTRUCTED BY A MULTITUDE OF SUCH PANELS; AND A METHOD FOR THE RECYCLING OF SUCH A PANEL

CROSS-REFERENCE TO RELATED APPLICATIONS

This application is the United States national phase of International Application No. PCT/EP2021/083000 filed Nov. 25, 2021, and claims priority to The Netherlands Patent Application No. 2026988 filed Nov. 26, 2020, the disclosures of which are hereby incorporated by reference in their entireties.

BACKGROUND OF THE INVENTION

Field of the Invention

The present invention relates to a decorative panel, in particular a floor, ceiling, or wall panel, of a planar design having a top side, a bottom side and multiple side edges, which panel has a laminated structure of layers that are adhered to each other, wherein the layers extend parallel to the plane of the panel, and include:

a core layer having a lower side and an upper side, and a top layer which is provided on the upper side of the core layer either directly or indirectly, wherein at least two layers of the panel, in particular the top layer and the core layer, are directly or indirectly adhered to each other by an intermediate adhesive layer.

Description of Related Art

Such a panel is known from the state of the art, and usually includes a core layer and a top layer which have different functional properties, and hence are made from different basic materials. When such panels after their use, are collected for recycling purposes in order to re-use the basic materials of the layers, it is thus advantageous to process the layers of different basic materials in separated streams. To accomplish that goal, the respective layers of the panel should first be separated from each other, so that subsequently the respective layers can be recycled in separate processing streams.

However, to separate or delaminate the constituting layers of a panel is not a straightforward task, as the adhesives that are commonly used in the field, are permanent adhesives such as polyurethane adhesives, which create a high adhesive strength and achieve a durable bonding of the layers which is cumbersome to break and requires excessive delamination forces. When such a bonding is eventually broken by applying such excessive forces, it is observed that a clean delamination of the different layers cannot be accomplished, and thus an imperfect separation of the layers is obtained.

Consequently, the recycling of the panels known from the art is compromised by the fact that a clean separation of the layers is not achievable, which results in a contamination of each of the separated streams of basic materials that is processed during recycling.

In view of the above inherent problems relating to the state of the art, a general need exists to develop a panel that is more suitable for recycling purposes than the presently known panels, and has at the same time a satisfactory quality for its intended use as a floor, ceiling or wall panel.

SUMMARY OF THE INVENTION

In order to meet the above general need, the invention proposes in a first aspect thereof, the provision of:

A decorative panel, in particular a floor, ceiling, or wall panel, of a planar design having a top side, a bottom side and multiple side edges, which panel has a laminated structure of layers that are adhered to each other, wherein the layers extend parallel to the plane of the panel, and include:

a core layer having a lower side and an upper side, and a (decorative) top layer which is provided on the upper side of the core layer, either directly or indirectly, wherein at least two layers of the panel, in particular said top layer and said core layer, are directly or indirectly, adhered to each other by an intermediate adhesive layer, wherein the intermediate adhesive layer is composed of adjacent intermediate zones which comprise one or more non-adhesive intermediate zones and one or more adhesive intermediate zones. The one or more adhesive intermediate zones realize an adhesive bond between said two layers. Hence, said intermediate adhesive layer establishes an adhesive strength between the two layers. Preferably, this adhesive bond is such that a durable adhesion between the two layers is obtained. This means that the layers of the panels remain adhered to each other during normal use and during the lifetime of the panel. However, due to the decrease of the amount of adhesive (glue) used in between said layers, compared to known panel, delamination of said layers (after use of the panel) can facilitated and simplified significantly. Preferably, a delamination, in particular a clean delamination, of said adhered layers is allowed for when the two layers are subjected to a sufficient delamination force, optionally in combination with irradiating and/or heating of the panel.

The panel according to the invention by virtue of the intermediate adhesive layer, has the technical effect of a reduced adhesive strength in comparison to an adhesive layer which is entirely composed of adhesive intermediate zones that are adjacent to each other so that the intermediate adhesive layer forms a continuous layer. The reduction in adhesive strength is hereby chosen such that the layers are durably adhered to each other. At the same time, the adhesive strength allows for a clean delamination of the two layers when the panel is subjected to an appropriate delamination force.

Consequently, the panel is highly suitable for recycling purposes because its constituting layers of different basic materials can be cleanly delaminated from each other, which allows for an improved purity of the separated basic material streams that are produced in the recycling process.

It is preferred in the panel according to the invention, that the adhesive intermediate zones comprise an adhesive material, more preferably a permanent adhesive and/or a thermoset adhesive. These adhesives are thermo-insensitive and have the benefit to realize a tight and reliable adhesive connection, but the general drawback that these adhesives impede post-use separation of glued layers for recycling purposes. A preferred example of such an adhesive is an adhesive material based on polyurethane or a polymeric mixture including polyurethane. Most thermoset adhesives are supplied as a two-component adhesive although one-part adhesives can be used as well. Two-component adhesives are typically made up of a resin and a hardener, in liquid or gel form, which are mixed to initiate the curing process. Curing typically takes between a couple of minutes and a few hours. In particular for these adhesives it is preferred apply both adhesive intermediate zones and non-adhesive intermediate zones primary to facilitate post-use separation and subsidiary to realize a material saving (saving of adhesive material).

With thermoplastic (hot melt or thermosensitive) adhesive, post-use separation issues do normally not occur as these adhesives soften at increased temperature.

In a further preferred embodiment of the panel according to the invention, the adhesive intermediate zones comprise discrete adhesive intermediate zones that are separated from each other.

For instance are such discrete adhesive intermediate zones configured as discrete dots, or as discrete lines that do not intersect.

In another preferred embodiment of the panel according to the invention, the adhesive intermediate zones comprise adhesive intermediate zones that are interconnected to each other, for instance interconnected adhesive intermediate zones that together substantially form a pattern, in particular grid pattern.

Such a grid pattern can be constituted from adhesive intermediate zones in the form of lines that are intersecting each other, and are interconnected as such. The pattern does not have to be a perfect mathematical pattern, as during adhesion of the two panel layers, in particular the top layer and the core layer, the flow (liquid) adhesive during compression of two layers to be adhered may occur in a somewhat uncontrolled manner, which may lead to (slightly) different shapes of adhesive intermediate zones, and consequently of neighbouring non-adhesive intermediate zones. With a pattern is meant a regularity of repeating intermediate zones which are arranged in a (reasonably) predictable manner. Preferably, the pattern, like a grid pattern, is a symmetric pattern. The pattern may, for example be a cracked pattern, a spotted pattern, a striped pattern, a tiled pattern, a dotted pattern, an intersecting lines pattern, or a spiral pattern. It is even imaginable that the arranged of the adhesive intermediate zones and non-adhesive intermediate zones is aligned with a decorative pattern or decorative image of and/or borne by the top layer. To this end, it is for example imaginable that adhesive is merely present underneath or below coloured and/or darker sections of the decorative pattern or decorative image. This prevents (seeped through portions of) the adhesive to be visible through lighter or blank sections of the decorative pattern or decorative image.

It is particularly preferred in the panel according to the invention, that the non-adhesive intermediate zones comprise void spaces.

As such, the adhesive intermediate layer can be formed by merely printing a pattern of adhesive intermediate zones on one or both layers to be adhered to each other, using commonly known printing techniques.

According to another preferred embodiment of the panel according to the invention, the non-adhesive intermediate zones comprise an inactivated adhesive material that establishes no adhesive strength between the layers, for instance a cured adhesive material.

The intermediate adhesive layer according to this embodiment, can be obtained by first applying a continuous layer of an adhesive material on one or both layers that are to be adhered to each other. Commonly known application techniques may be used for applying such a continuous layer. Subsequently, specific zones of the continuous layer of adhesive material that correspond with an intended pattern of non-adhesive intermediate zones, are inactivated by commonly known techniques for instance by curing of the adhesive material. Inactivation by curing can expediently be accomplished by irradiation of the continuous layer through a mask wherein the mask is provided with openings which allow for the irradiation of zones of the continuous layer that correspond with the intended pattern of non-adhesive intermediate zones.

It is further preferred in the panel according to the invention, that the non-adhesive intermediate zones comprise an adhesive material that is covered at an upper side and/or a bottom side thereof, with a masking layer of a material that has no adhesive properties with respect to the layer the masking layer is in contact with.

In such a panel, the masking layer may be provided onto a bottom side and/or upper side of a continuous layer of adhesive material. The masking layer as a whole is provided with openings that correspond to an intended pattern of adhesive intermediate zones, while the material of the masking layer that surrounds the openings forms a barrier which shields off the adhesive material from the layer the masking layer is in contact with.

It is especially preferred in the panel according to the invention, that the value of the adhesive strength of the intermediate adhesive layer is 60% or less, preferably 50% or less, more preferably 40% or less, of the adhesive strength of an intermediate adhesive layer of the same thickness which is entirely composed of adhesive intermediate zones that are adjacent to each other and thus form a continuous layer, in particular in the instance wherein the continuous layer comprises an adhesive material based on polyurethane or a polymeric mixture including polyurethane.

The one or more adhesive intermediate zones are commonly composed of adhesive or glue, while the one or more non-adhesive intermediate zones are preferably free of any adhesive or glue, and more in particular are preferably free of any substance. Typically, at these non-adhesive intermediate zones do not contribute to adhere two layers enclosing said adhesive layer, and hence decrease the net bonding strength of the intermediate adhesive layer as such, which facilitates post-use (post-consumer) processing, in particular recycling.

It is conceivable that only one adhesive intermediate zone is applied, while a plurality of non-adhesive intermediate zones is applied. It is also conceivable that only one non-adhesive intermediate zone is applied, while a plurality of adhesive intermediate zones is applied. However, it is often more preferred that a plurality of adhesive intermediate zones is applied, and that a plurality of non-adhesive intermediate zones is applied. Preferably, the intermediate adhesive layer extends over the entire (front) surface of the layers adhered by said intermediate adhesive layer. This latter will ensure sufficient bonding between the layers across their entire (facing, front) surfaces. Preferably, the one or more adhesive intermediate zones and the one or more non-adhesive intermediates zones are position-selectively (rather than randomly) applied, more preferably in a predefined manner. Preferably, the one or more adhesive intermediate zones define(s) a pattern. Typically, the one or more non-adhesive intermediate zones define(s) a complementary pattern. The pattern defined by the adhesive intermediate zones and/or the non-adhesive intermediate zones may, for example, define a grid and/or a matrix pattern and/or a dotted pattern. It is imaginable that at least one intermediate zone is formed by a plurality of interconnected or intersecting line segments, wherein adjacent line segments mutually enclose an angle (between 0 and 180 degrees). Here, it is imaginable that at least two line segments are interconnected, but not intersecting, which could, for example, lead to the shape of one of the following characters: W, E, T, Y, F, H, K, L, Z, V, N, M. However, it is also conceivable that at least two line segments are intersecting, which would result in a shape of, for example, one of the following characters: +, X, *, #. A combination of intersecting line segments and interconnected, but not intersecting line segments, is also imaginable. A pattern composed of a plurality of broken lines (dashed lines or line segments or dotted lines) can be applied. In this pattern, preferably the broken lines are mutually essentially oriented in parallel, but may also define, for example, a matrix shape. Alternative, the one or more intermediate zones may have, for example, a curved shape, such as a circular shape and/or oval shape and/or elliptic shape, and/or may have a polygonal shape, such as a square shape, rectangular shape, or triangular shape.

The surface area covered by said one or more adhesive intermediate zones and the surface area covered by said one or more non-adhesive intermediate zones define a ratio, wherein said ratio is preferably situated between 0.4 and 9, more preferably between 0.66 and 9, most preferably between 1 and 9. Said maximum value of 9 may be decreased to 8, 7, 6, 5, and even 4. This will typically depend on the bonding strength of the adhesive used, the desired overall bonding strength to adhere the surrounding layers, and the conditions needed to be able to delaminate the layers for recycling purposes, typically after expiration of the panel lifetime.

The one or more adhesive intermediate zones and/or the one or more non-adhesive intermediate zones is/are preferably applied in liquid form, preferably by using a roller, more preferably a roller having a profiled surface, and/or by using a mask, and/or by using an adhesive printer (glue printer). In case a profiled roller is used, the profiled outer surface of said roller typically defines the pattern of the (still liquid) intermediate zones applied onto a layer prior to adhering said layer to another layer of the panel, during production of the panel Additionally, the following dimensional properties of the panel according to the invention are preferred:

- the planar design is of a rectangular or hexagonal shape;
- the panel has a length in the range of 0.40 to 2.0 m, a width in the range of 70 to 180 mm, and an overall thickness of 2 to 20 mm, preferably 3 to 12 mm;
- the core layer has a thickness of 2 mm to 7 mm, and/or the top layer has a thickness of 1 mm to 5 mm.

It is noted that in view of the above preferred dimensions of the panel, the panel has a satisfactory suitability for recycling purposes, especially in regard of the process of cleanly delaminating the two layers.

The top layer used in the panel may composed of a single decorative layer only, wherein said decorative layer may bear a decorative pattern or decorative image. However, it is typically preferred that the top layer is composed of a laminate of multiple (sub)layers. This laminated top layer may also be referred to as top laminate or top structure. Preferably, the top layer comprises a decorative layer which is visible at the top side of the panel, and which preferably comprises a polymeric material.

Further preferred in the panel according to the invention, is that the top layer comprises at least one wear layer, which is preferably of transparent quality and/or comprises a polymeric material. Optionally, the wear layer is covered by a top coating.

Preferably, the decorative top layer comprises a decorative visual print layer, at least one substantially transparent or translucent wear layer applied on top of said print layer, and, preferably, at least one substantially transparent or translucent top coating layer applied on top of said at least one wear layer. The visual print layer may be composed solely of a decorative ink layer, but is also imaginable that the visual print layer comprises a substrate layer, such as a polymer film or paper film, onto which a decorative ink layer is printed or otherwise applied. Said visual print layer may be attached directly to the core layer, in particular position-selectively glued onto the core layer, e.g. by using a polyurethane adhesive. Optionally, an upper surface of the core layer is covered by at least one primer layer before attaching the visual print layer to the core, wherein the visual print layer will actually be attached to the (upper) primer layer applied to the core layer. The primer layer may be position-selectively adhered to the core layer by means of an adhesive layer is composed of adjacent intermediate zones which comprise one or more non-adhesive intermediate zones and one or more adhesive intermediate zones. It is imaginable that the decorative top structure comprises a decorative visual print layer and a single—only one—transparent or translucent wear layer on top of said visual print layer without applying a separate top coating layer. At one wear layer, and preferably each wear layer in case a plurality of wear would be applied, is preferably made of transparent or translucent polyurethane or, alternatively, polyvinylchloride, polypropylene, or any another suitable transparent or translucent polymer.

In a preferred embodiment, the top layer comprises a textured surface, in particular a textured upper surface (defining a top surface of the panel). Preferably, the texture surface makes part of at least one transparent and/or translucent layer, in particular at least one wear layer and/or at least one top coating. Preferably a decorative visual print layer is located underneath said at least one transparent and/or translucent layer. This textured surface (relief surface) typically improves the optical and haptic appearance of the decorative layer. Said textured surface comprises a pattern of recesses (indentations or impressions) and/or projections, wherein said pattern is preferably at least partially realized by means of printing, in particular digital printing (i.e. by means of a digital printing technique). Digital printing is a method of printing from a digital-based image directly to a media. This digital image can be a decorative image, such as the aforementioned decorative visual print, but also an image representing another part of the top structure, such as at least one wear layer and/or at least one top coating. The digital image can either be a 2D or a 3D image. By digitally (3D) printing the top structure, an infinite degree of freedom of design of the top structure (and the decorative layer) can be obtained, wherein the top structure (and the decorative layer) moreover can be applied in an accurate manner with a high level of detail, which leads to realistic appearances and unique, one-of-a-kind decorative panels. This result cannot be achieved by means of traditional mechanically impressed covering structures. As printing device(s), for example, one or more inkjet printers and/or laser printers may be used. As indicated above, a substantially transparent or translucent part of the top structure may be partially or entirely digitally printed. The decorative visual print layer is preferably digitally printed. To this end, transparent or translucent, either coloured or non-coloured (transparent), ink may be used. At least one substance, in particular ink, used to realize at least a part of the decorative top structure, may be provided with graphene and/or graphene derivative(s) and/or other (solid) particles. This latter results in the situation that graphene and/or graphene derivative(s) can be applied by means of printing, in particular digital printing, or alternatively by means of spraying, pouring or rolling. It is also imaginable that the adhesive intermediate zones of at least one intermediate adhesive layer, used to adhere at least two layers of the panel, in particular the top layer and the core layer and/or the back layer and the core layer, is applied onto at least one layer to be adhered, by means of printing, preferably digital printing. As mentioned above, the printing pattern of the adhesive may at least partially be aligned (i) with the decorative pattern or decorative image of the decorative layer and/or (ii) with the (printed) textured surface of the top layer.

In a special embodiment of the panel according to the invention, the layers of the panel further include a backing layer that is directly or indirectly adhered to the lower side of the core layer by the intermediate adhesive layer.

It is particularly preferred in the panel according to the invention, that the core layer comprises a polymeric material, for instance polyurethane or a polymeric mixture including polyurethane.

A further preferred embodiment of the panel according to the invention, features that the core layer comprises a polymeric material which is a mixture of recycled polymeric material and virgin polymeric material.

It is preferred in the panel according to the invention, that the panel comprises at least one pair of two opposite side edges which are provided with respective interconnecting profiles that are complementary to each other, such as a tongue and a groove profile. Preferably the panel comprises at least two pair of opposite edges, wherein each pair of opposite edges is provided with respective interconnecting profiles that are complementary to each other, such as a tongue and a groove profile. The shape and coupling mechanism of distinctive pairs of opposite edges may mutually be distinctive.

Such a design of the panel, allows for the construction of a covering of a multitude of adjacent panels that are interconnected to each other by virtue of the interconnecting profiles.

In particular it is preferred that the interconnecting profiles are provided as an integral part of the core layer of the panel.

It is further preferred in this context, that the interconnecting profiles allow for a coupling of two panels by a vertical and/or an angling movement of the respective side edges.

A second aspect of the invention relates to a floor, ceiling, or wall covering constructed by a multitude of adjacent panels according to the first aspect of the invention.

According to a third aspect of the invention, a method is proposed for recycling of a panel, wherein the method comprises the consecutive steps of:

i. collecting panels wherein each panel is defined according to the first aspect of the invention;
ii. delaminating each collected panel which involves applying a sufficient delamination force by which two layers that are adhered to each other by the intermediate adhesive layer, are delaminated.

Preferably the above method according to the invention further comprises a subsequent step of:

iii. separately processing of the two delayers that are obtained in step ii., in respective separated streams.

Further embodiments of the invention are presented in the non-limitative set of clauses presented below.

CLAUSES

1. Panel, in particular a floor, ceiling, or wall panel, of a planar design having a top side, a bottom side and multiple side edges, which panel has a laminated structure of layers that are adhered to each other, wherein the layers extend parallel to the plane of the panel, and include:

a core layer having a lower side and an upper side, and a top layer which is provided on the upper side of the core layer either directly or indirectly, wherein at least two layers of the panel, in particular the top layer and the core layer, are directly or indirectly adhered to each other by an intermediate adhesive layer, wherein the intermediate adhesive layer is composed of adjacent intermediate zones which comprise one or more non-adhesive intermediate zones and one or more adhesive intermediate zones.

2. Panel according to clause 1, wherein the adhesive intermediate zones comprise an adhesive material, preferably an adhesive material based on polyurethane or a polymeric mixture including polyurethane.
3. Panel according to one of the preceding clauses, wherein the adhesive intermediate zones comprise discrete adhesive intermediate zones that are separated from each other.
4. Panel according to one of the preceding clauses, wherein the one or more adhesive intermediate zones define a pattern.
5. Panel according to one of the preceding clauses, wherein the adhesive intermediate zones comprise adhesive intermediate zones that are interconnected to each other, for instance interconnected adhesive intermediate zones that together form a pattern, in particular a grid pattern.
6. Panel according to one of the preceding clauses, wherein the non-adhesive intermediate zones comprise void spaces and/or are free of any adhesive.
7. Panel according to one of the preceding clauses, wherein the non-adhesive intermediate zones comprise an inactivated adhesive material that establishes no adhesive strength between the layers, for instance a cured adhesive material.
8. Panel according to one of the preceding clauses, wherein the non-adhesive intermediate zones comprise an adhesive material that is covered at an upper side and/or a bottom side thereof, with a masking layer of a material that has no adhesive properties with respect to the layer the masking layer is in contact with.
9. Panel according to one of the preceding clauses, wherein the value of the adhesive strength of the intermediate adhesive layer is 60% or less, preferably 50% or less, more preferably 40% or less, of the adhesive strength of an intermediate adhesive layer of the same thickness which is entirely composed of adhesive intermediate zones that are adjacent to each other and thus form a continuous layer, in particular in the instance wherein the continuous layer comprises an adhesive material based on polyurethane or a polymeric mixture including polyurethane.
10. Panel according to one of the preceding clauses, wherein the surface area covered by said one or more adhesive intermediate zones and the surface area covered by said one or more non-adhesive intermediate zones define a ratio, wherein said ratio is situated between 0.4 and 9, more preferably between 0.66 and 9, more preferably between 1 and 9.

11. Panel according to one of the preceding clauses, wherein the planar design is of a rectangular or hexagonal shape.
12. Panel according to one of the preceding clauses, wherein the panel has a length in the range of 0.40 to 2.0 m, a width in the range of 70 to 180 mm, and an overall thickness of 2 to 20 mm, preferably 3 to 12 mm.
13. Panel according to one of the preceding clauses, wherein the core layer has a thickness of 2 mm to 7 mm, and/or the top layer has a thickness of 1 mm to 5 mm.
14. Panel according to one of the preceding clauses, wherein the top layer comprises a decorative layer which is visible at the top side of the panel, and which preferably comprises a polymeric material.
15. Panel according to one of the preceding clauses, wherein the top layer comprises a wear layer, which is preferably of transparent quality and/or comprises a polymeric material.
16. Panel according to one of the preceding clauses, wherein the layers of the panel further include a backing layer that is directly or indirectly adhered to the lower side of the core layer by the intermediate adhesive layer.
17. Panel according to one of the preceding clauses, wherein the core layer comprises a polymeric material, for instance polyurethane or a polymeric mixture including polyurethane.
18. Panel according to one of the preceding clauses, wherein the core layer comprises a polymeric material which is a mixture of recycled polymeric material and virgin polymeric material.
19. Panel according to one of the preceding clauses, wherein the panel comprises at least one pair of two opposite side edges which are provided with respective interconnecting profiles that are complementary to each other, such as a tongue and a groove profile.
20. Panel according to clause 19, wherein the interconnecting profiles allow for a coupling of two panels by a vertical and/or an angling movement of the respective side edges.
21. Panel according to clause 19 or 20, wherein the panel comprises two pairs opposite side edges, wherein each pair of opposite edges is provided with respective interconnecting profiles that are complementary to each other, such as a tongue and a groove profile.
22. Panel according to any of the preceding clauses, wherein said intermediate adhesive layer establishes an adhesive strength between the two laminated layers such that a clean delamination of the two layers is allowed for when the two layers are subjected to a sufficient delamination force.
23. Floor, ceiling, or wall covering constructed by a multitude of adjacent panels according to one of the preceding clauses.
24. Method for recycling of a panel, wherein the method comprises the consecutive steps of:
i. collecting a multitude of panels wherein each panel is defined according to one of the preceding clauses 1-22, and
ii. delaminating each collected panel which involves applying a sufficient delamination force by which two layers that are adhered to each other by the intermediate adhesive layer are delaminated.
25. Method according to clause 24, further comprising a subsequent step of:
iii. separately processing of the two delayers that are obtained in step ii., in respective separated streams.

BRIEF DESCRIPTION OF THE DRAWINGS

The invention will be further elucidated by examples of preferred, non-limitative embodiments of the invention which are shown in the appended figures, wherein.

DESCRIPTION OF THE INVENTION

Figure 1:
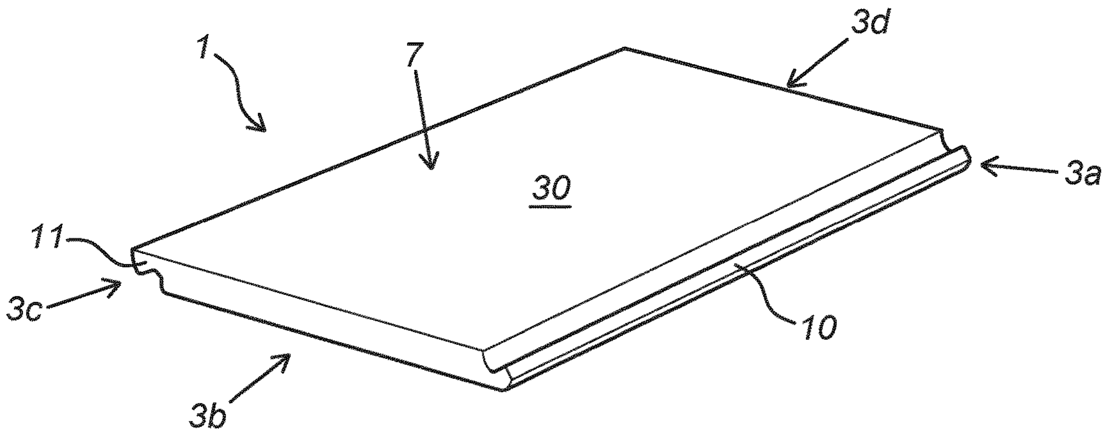
FIG. 1 shows in perspective a panel according to the invention.

FIG. 1 shows a panel 1 suitable as a floor, ceiling or wall panel, which panel is of a planar design having an top side 7, a bottom side and side edges 3*a-d* which comprise a first side edge 3*a* provided with a first profile 10 and a second side edge 3*c* provided with a second profile 11. A top layer 30 is present at the top side 7 of the panel.

Figure 2:
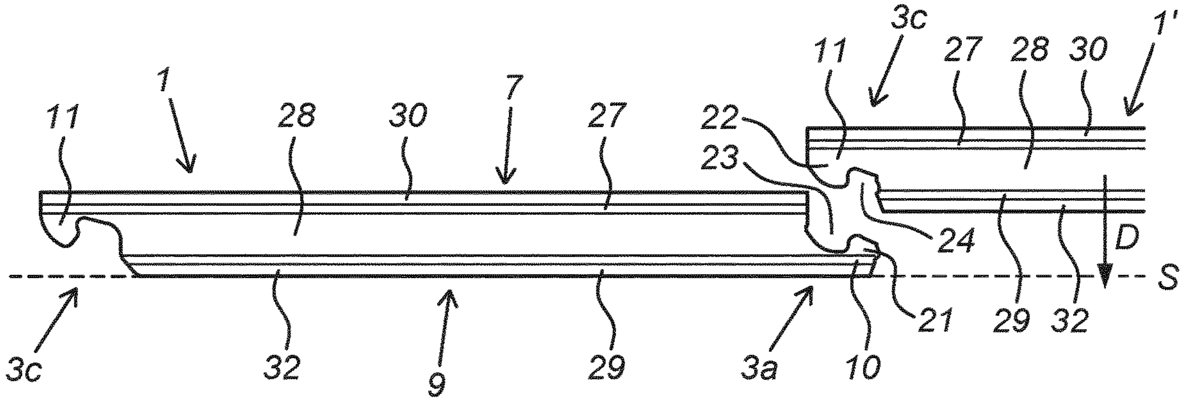
FIG. 2 shows a cross-sectional view of two panels and their coupling profiles according to the invention.

FIG. 2 shows a cross-section of the panel 1 of FIG. 1, perpendicular to the first and second side edges 3*a* and 3*c*, which are provided with a first profile 10 and a second profile 11. The bottom side 9 of the panel 1, is laid on a substrate layer for instance a floor surface S.

The panel 1 has a laminated structure of layers 28, 30 and 32 that are adhered to each other, which layers extend parallel to the plane of the panel 1, and comprise:

a core layer 28 having a lower side and an upper side, a top layer 30 which is adhered on the upper side of the core layer by an intermediate adhesive layer 27 according to the invention, and a backing layer 32 which is adhered on the lower side of the core layer by an intermediate adhesive layer 29 according to the invention.

Further in FIG. 2, another identical panel 1' is shown in part, of which the second side edge 3*c* is to be coupled to the panel 1, by a downward vertical movement indicated by vector D.

The first profile 10 and the second profile 11 of both panels 1 and 1' are mutually interacting profiles that can be coupled to each other and are complementary to each other. During coupling, the second profile 11 of panel 1' is vertically inserted in the first profile 10 of panel 1, which involves the downward tongue 22 of panel 1' being inserted in the first groove 23 of panel 1, and the upward tongue 21 of panel 1 being inserted in the second groove 24 of panel 1'. When coupled, the panels 1 and 1' lie in a common plane which is parallel to the floor surface S.

Figure 3:
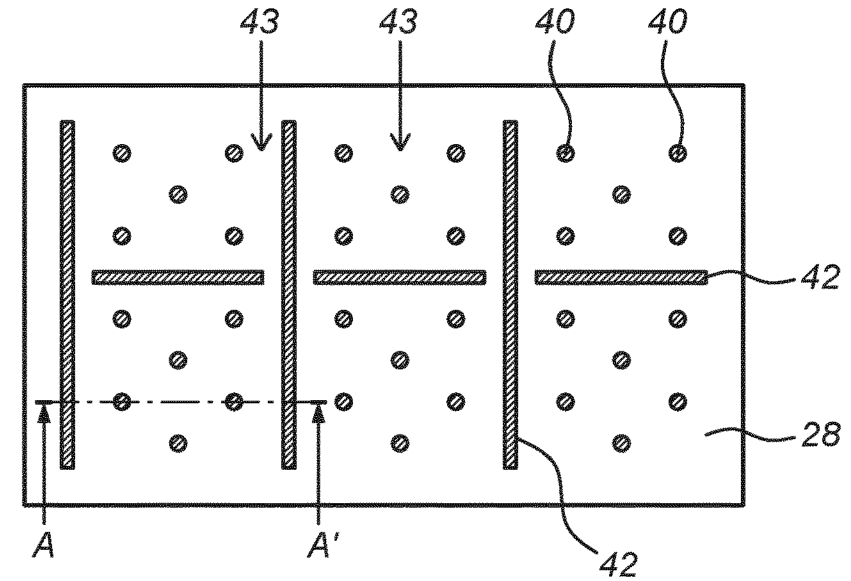
FIG. 3 shows a top view of a part of the panel of FIG. 2.

FIG. 3 shows a top view of a part of the panel according to FIG. 2, wherein the top layer is not depicted for illustrative purposes, and hence shows the structure underneath the top layer which comprises a top surface of the core layer 28 on which an intermediate adhesive layer is present. The intermediate adhesive layer comprises adhesive intermediate zones in the form of discrete dots 40 and discrete lines 42 of equal thickness which are both made from an adhesive material. A further part of the intermediate adhesive layer comprises non-adhesive intermediate zones 43 in the form of void spaces 43 that are present between the discrete dots 40 and discrete lines 42.

Figure 4:
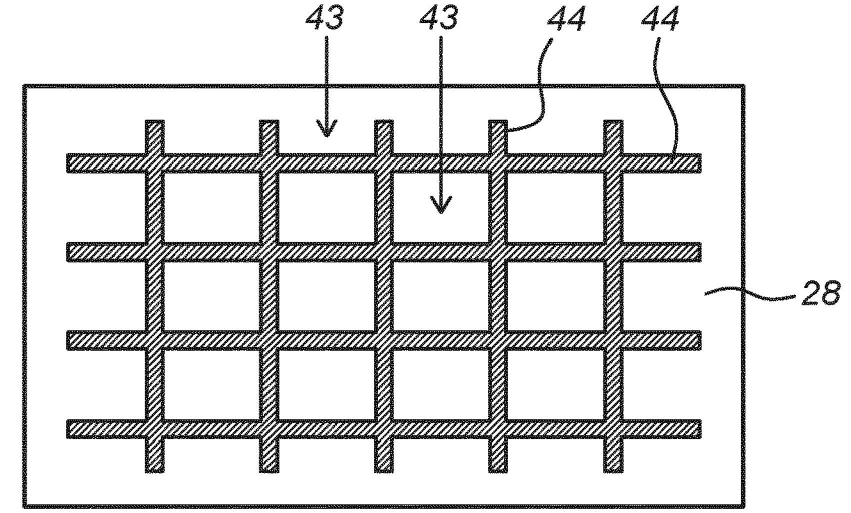
FIG. 4 shows a top view of a part of an alternative embodiment of the invention.

FIG. 4 shows analogously to FIG. 3, a top view of a part of an alternative embodiment of the invention, wherein the top layer is not depicted for illustrative purposes. The shown part of the alternative panel comprises a top surface of the core layer 28 on which an intermediate adhesive layer is present. The intermediate adhesive layer comprises adhesive intermediate zones in the form of intersecting lines 44 of adhesive material, which together form a grid structure. A further part of the intermediate adhesive layer comprises non-adhesive intermediate zones 43 in the form of void spaces 43 that are present outside the grid structure of lines 44.

Figure 5:
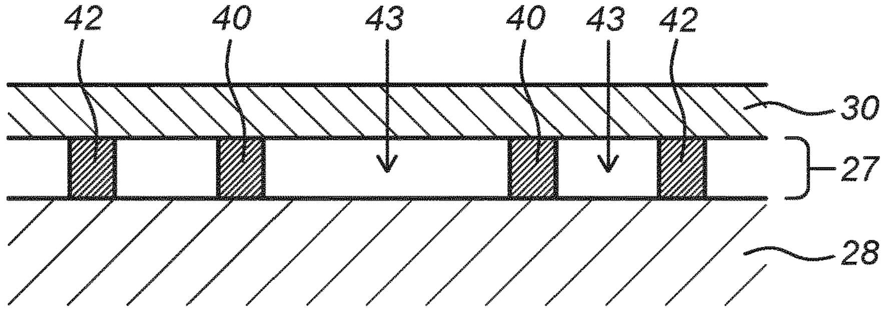
FIG. 5 shows a cross-sectional view of a part of the panel of FIG. 3.

FIG. 5 shows a cross-sectional view of a part of the panel along lines A-A' indicated in FIG. 3, wherein the top layer 30 is included. The top layer 30 is adhered onto the upper side of the core layer 28 by the intermediate adhesive layer 27. The intermediate adhesive layer 27 is composed of adjacent intermediate zones that comprise adhesive intermediate zones in the form of dots 40 and lines 42 of adhesive material, and non-adhesive intermediate zones in the form of void spaces 43.

Figure 6:
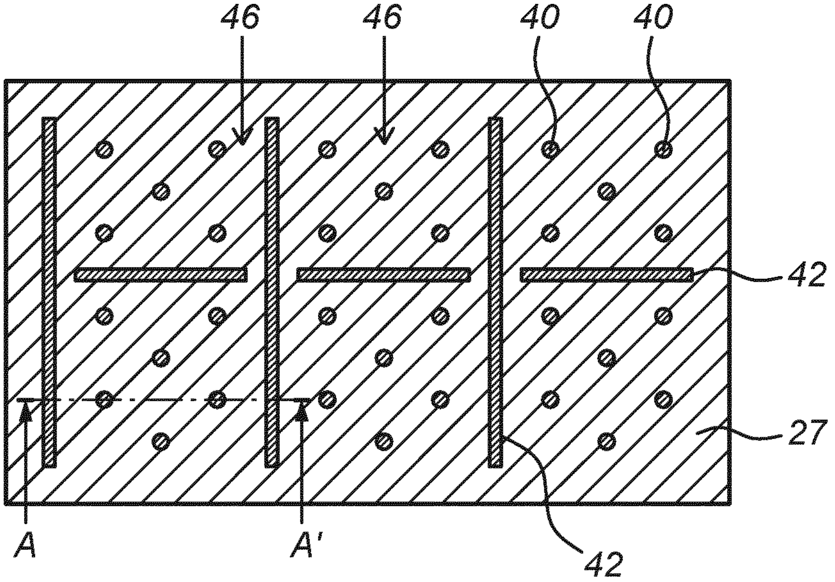
FIG. 6 shows a top view of a part of an alternative embodiment of the invention.

FIG. 6 shows analogously to FIG. 3, a top view of a part of an alternative embodiment of the invention, wherein the top layer is not depicted for illustrative purposes. In the shown embodiment, the top surface of the core layer is not visible, as the top surface is entirely covered by an intermediate adhesive layer 27, which contains non-adhesive intermediate zones of cured adhesive 46 (indicated by the hatched lines) and adhesive intermediate zones in the form of dots 44 and lines 42 of adhesive material.

Figure 7:
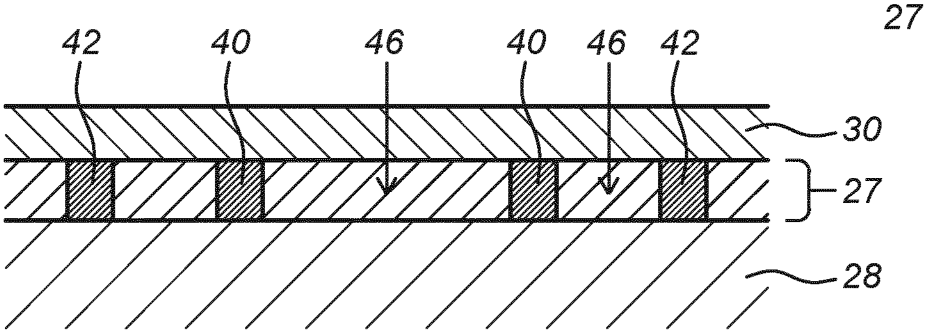
FIG. 7 shows a cross-sectional view of a part of the panel of FIG. 6.

FIG. 7 shows a cross-sectional view of a part of the panel along lines A-A' indicated in FIG. 6, wherein the top layer 30 is included. The top layer 30 is adhered onto the upper side of the core layer 28 by the intermediate adhesive layer 27. The intermediate adhesive layer 27 comprises adhesive intermediate zones in the form of dots 40 and lines 42 of adhesive material, and non-adhesive intermediate zones of cured adhesive material 46 (indicated by the hatched lines).

The hereby presented invention has been illustrated by several illustrative embodiments. It is noted that any features of the invention described herein are disclosed not only in their explicit combination, but also as a group of features wherein each feature should be construed as disclosed independent from another, and as such is an individual, preferred feature of the invention.

In the present application, the non-limited verb "comprise" and conjugations thereof, is used in a broader sense by which also the limited verb "contain", "substantially consist of", "formed by" are included.

The invention claimed is:

1. A decorative panel of a planar design having a top side, a bottom side and multiple side edges, the panel having a laminated structure of layers that are adhered to each other, wherein the layers extend parallel to the plane of the panel, and comprises:

a core layer having a lower side and an upper side, and a top layer is provided on the upper side of the core layer either directly or indirectly, wherein the top layer comprises:

a decorative visual print layer, and at least one substantially transparent or translucent wear layer applied on top of said print layer, wherein at least two layers of the panel, the top layer and the core layer, are directly or indirectly adhered to each other by an intermediate adhesive layer, wherein the intermediate adhesive layer is composed of adjacent intermediate zones comprise one or more non-adhesive intermediate zones and one or more adhesive intermediate zones, wherein the one or more adhesive intermediate zones define a pattern.

2. The panel according to claim 1, wherein the adhesive intermediate zones comprise an adhesive material based on polyurethane or a polymeric mixture comprising polyurethane.

3. The panel according to claim 1, wherein the adhesive intermediate zones comprise discrete adhesive intermediate zones that are separated from each other.

4. The panel according to claim 1, wherein at least two sets of two adjacent layers of the panel, are directly or indirectly adhered to each other by an intermediate adhesive layer, wherein each intermediate adhesive layer is composed of adjacent intermediate zones that comprise one or more non-adhesive intermediate zones and one or more adhesive intermediate zones, wherein the one or more adhesive intermediate zones define a pattern.

5. The panel according to claim 1, wherein the adhesive intermediate zones comprise adhesive intermediate zones that are interconnected to each other to form a grid pattern.

6. The panel according to claim 1, wherein the non-adhesive intermediate zones comprise void spaces and/or are free of any adhesive.

7. The panel according to claim 1, wherein the non-adhesive intermediate zones comprise an inactivated adhesive material that establishes no adhesive strength between the layers.

8. The panel according to claim 1, wherein the non-adhesive intermediate zones comprise an adhesive material that is covered at an upper side and/or a bottom side thereof, with a masking layer of a material that has no adhesive properties with respect to the layer the masking layer is in contact with.

9. The panel according to claim 1, wherein the value of the adhesive strength of the intermediate adhesive layer is 60% or less of the adhesive strength of an intermediate adhesive layer of the same thickness that is entirely composed of adhesive intermediate zones that are adjacent to each other and thus form a continuous layer.

10. The panel according to claim 1, wherein the surface area covered by said one or more adhesive intermediate zones and the surface area covered by said one or more non-adhesive intermediate zones define a ratio, wherein said ratio is situated between 0.4 and 9.

11. The panel according to claim 1, wherein the panel has a length in the range of 0.40 to 2.0 m, a width in the range of 70 to 180 mm, and an overall thickness of 2 to 20 mm.

12. The panel according to claim 1, wherein the top layer comprises a wear layer that is of transparent quality and/or comprises a polymeric material.

13. The panel according to claim 1, wherein at least one substantially transparent or translucent top coating layer applied on top of said at least one wear layer.

14. The panel according to claim 1, wherein the layers of the panel further comprise a backing layer that is directly or indirectly adhered to the lower side of the core layer by the intermediate adhesive layer, wherein the back layer and the core layer, are directly or indirectly adhered to each other by an intermediate adhesive layer, wherein the intermediate adhesive layer is composed of adjacent intermediate zones that comprise one or more non-adhesive intermediate zones and one or more adhesive intermediate zones.

15. The panel according to claim 1, wherein the core layer comprises polyurethane or a polymeric mixture comprising polyurethane.

16. The panel according to claim 1, wherein the core layer comprises a polymeric material that is a mixture of recycled polymeric material and virgin polymeric material.

17. The panel according to claim 1, wherein the panel comprises at least one pair of two opposite side edges that are provided with respective interconnecting profiles that are complementary to each other.

18. The floor, ceiling, or wall covering constructed by a multitude of adjacent panels according to claim 1.

19. A method for recycling of a panel, wherein the method comprises consecutive steps of:

i. collecting a multitude of panels wherein each panel is defined according to claim 1, and ii. delaminating each collected panel that involves applying a sufficient delamination force such that two layers that are adhered to each other by the intermediate adhesive layer are delaminated.

20. The method according to claim 19, further comprising a subsequent step of:

separately processing of the two delaminated layers that are obtained in step ii., in respective separated streams.

* * * * *